UNITED STATES PATENT OFFICE.

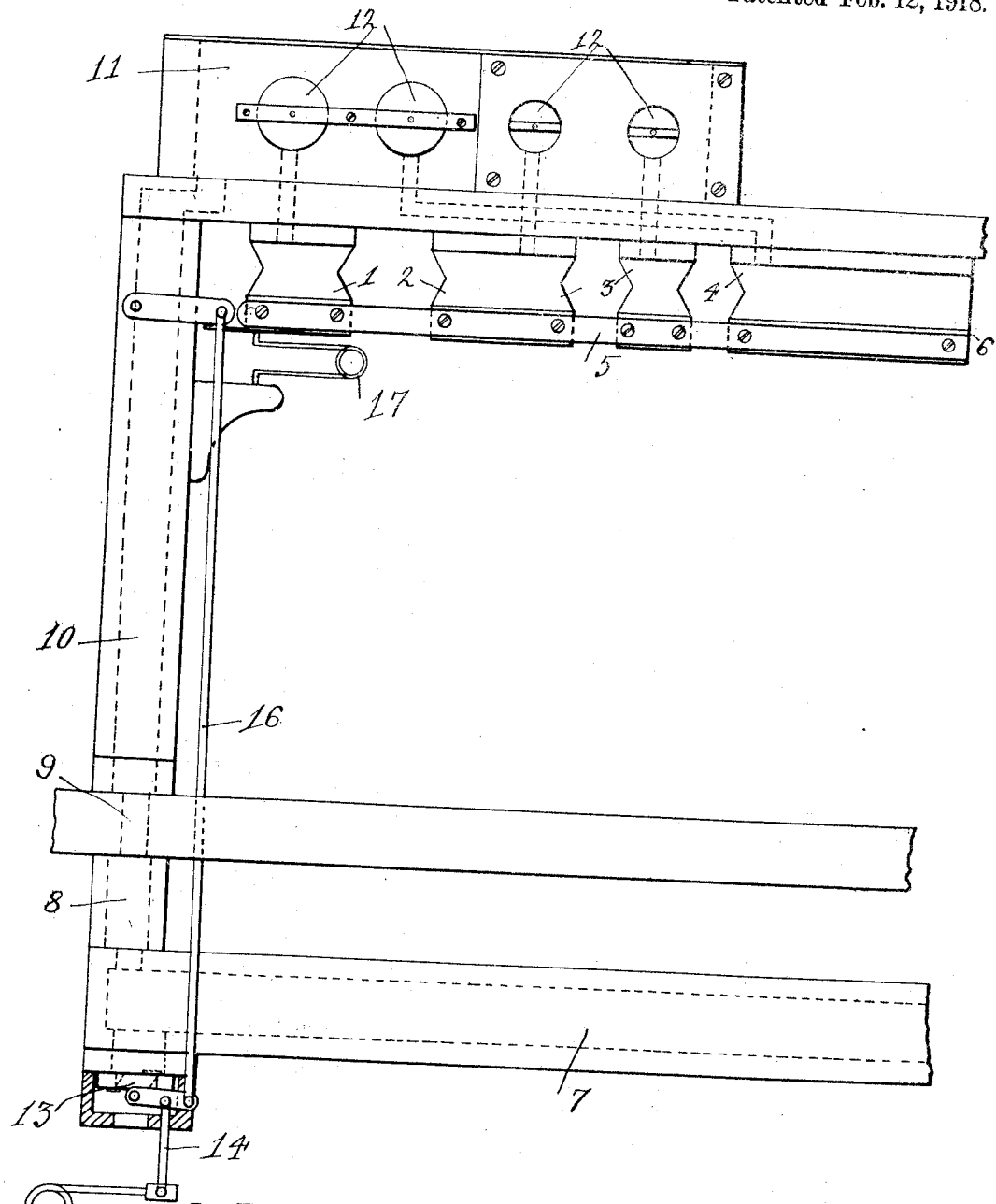

ROBERT A. GALLY, OF CINCINNATI, OHIO, ASSIGNOR TO THE BALDWIN COMPANY, OF CINCINNATI, OHIO.

AIR-CONTROL GOVERNOR.

1,256,468.  Specification of Letters Patent.  Patented Feb. 12, 1918.

Application filed September 20, 1917. Serial No. 192,397.

*To all whom it may concern:*

Be it known that I, ROBERT A. GALLY, a citizen of the United States, and residing at Cincinnati, in the county of Hamilton and State of Ohio, have invented certain new and useful Improvements in Air-Control Governors, of which the following is a specification.

When an air governor has one or more moving elements of its bellows, reservoir or pneumatic, of considerable weight compared to the amount of work to be performed by its governing action, and especially when said moving element or elements move in a vertical direction, and particularly with the weight thereof acting oppositely to the power of the air on such moving element or elements, but a small part, if any, of the measure of resistance for the governing can then be secured by a spring, the said weight amounting to so much of the total resistance required, and consequently the action of the governor will be slower than if such resistance were principally or entirely of the lively action of a spring character means, wherefore it is desirable to employ a spring to more or less counterbalance the weight or inertia of the moving element or elements, or even to overbalance such weight, and thus be able to employ a main governor spring means of an activity to secure a quick and sensitive action of the governor.

While opposite springs have been used in reservoir bellows, as in Knagge #1,106,820, Aug. 11, 1914, no such devices have been employed for governor valve control, nor for counteracting the weight of the moving parts.

In the drawing is shown a compound reservoir or pneumatic with its moving elements 1, 2, 3, 4, in a horizontal succession and bound together by an arm or lever 5, the entire set of elements moving as one from a common hinge at 6. A chest 7 or other suitable air service is provided, and has connections through any usual windways as 8, 9, 10, 11, to the pneumatic governor elements 1, 2, 3, 4, or any other compound or single governor means having one or more moving elements, being vertically moving in the showing herein, and if of compound type such elements may have any style suitable controlling valves, as 12 or equivalent devices, as more fully described in applicant's prior application #179,414.

A governor valve as 13 is combined with the air service 7 in the present instance, being used as a relief of surplus air, similar to said application #179,414, although the present governor and counterbalance may be used with any other type of governing valve, as the usual "choker". The valve 13 has a connection 14 and spring 15 adapted to pull the said valve closed against the pull of the governor elements 1, 2, 3, 4, the wire or rod 16 connecting the said elements 1, 2, 3, 4, to the said valve 13. The particular style of valve here shown is of the improved form set forth in applicant's prior application #178,004.

A spring 17 is so disposed as to counterbalance the weight of the governor elements 1, 2, 3, 4, arm 5, and rod 16, so that the live working resistance of the spring 15 is the principal or only factor to be overcome by the air pull of the governor elements 1, 2, 3, 4.

The counterbalance spring 17 may be used with either a simple or compound governor means, as before stated, but is especially desirable with the compound type having changeable elements, as in such type when only one element is in action, the small power of that one element must actuate the entire device.

The use of two counteracting springs, as 15, 17, will for some uses improve the responsiveness of a quick acting governor even when the moving element or elements move horizontally instead of vertically, as the moving parts are thereby under a tense condition of activity, the counter spring enabling the use of a that much stronger governor spring, the dead weight of the moving parts being thereby controlled by such added spring activity.

What I claim as my invention is:—

1. An air governor bellows including a constantly moving and vertically acting element; a governor valve and connections from the said moving element to the said valve; a spring opposed to the weight of the said moving element; and a governor spring opposed to the active pull of the said moving element, said active pull being upward.

2. An air governor bellows including a constantly moving and vertically acting moving element; a governor valve and connections from the said moving element to the said valve; a spring to substantially counterbalance the weight of the said moving element; and a governor spring opposed to the active pull of the said moving element, said active pull being upward.

3. An air governor bellows including a constantly moving and vertically acting moving element; a governor valve and connections from the said moving element to the said valve; an upwardly acting spring to substantially counterbalance the weight of the said moving element; and a downwardly acting governor spring opposed to the active pull of the said moving element.

4. An air governor bellows including a constantly moving and vertically acting moving element having an upward pull effected by the air; a governor valve and connections from the said moving element to the said valve; an upwardly acting spring to substantially counterbalance the weight of the said said moving element; and a governor spring opposed to the active pull of the said moving element.

ROBT. A. GALLY.

Witnesses:
PAUL J. HENGGE,
NORMA KEISER.

Copies of this patent may be obtained for five cents each, by addressing the "Commissioner of Patents, Washington, D. C."